(12) United States Patent
Ullein et al.

(10) Patent No.: US 6,336,882 B1
(45) Date of Patent: Jan. 8, 2002

(54) CHAIN WHEEL WITH DAMPING

(75) Inventors: Thomas Ullein, Stegaurach; Bolko Schuseil, Adelsdorf, both of (DE)

(73) Assignee: INA Walzlager Schaeffler oHG (DE)

( * ) Notice: Subject to any disclaimer, the term of this patent is extended or adjusted under 35 U.S.C. 154(b) by 0 days.

(21) Appl. No.: 09/502,662

(22) Filed: Feb. 11, 2000

(30) Foreign Application Priority Data

Feb. 15, 1999 (DE) .......................................... 199 06 003

(51) Int. Cl.$^7$ ................................................ F16H 55/06
(52) U.S. Cl. .......................................... 474/161; 474/94
(58) Field of Search ........................ 474/94, 148, 156, 474/160, 161; 74/572, 573, 574

(56) References Cited

U.S. PATENT DOCUMENTS

| | | | |
|---|---|---|---|
| 2,674,897 A | | 4/1954 | Heinish |
| 4,328,879 A | * | 5/1982 | Tone .......................... 180/219 |
| 4,486,183 A | * | 12/1984 | Posiviata et al. ............. 474/94 |
| 4,881,930 A | * | 11/1989 | Oertley ....................... 474/162 |
| 4,946,427 A | * | 8/1990 | Rampe ........................ 474/161 |
| 5,026,329 A | * | 6/1991 | Dickevers ................... 474/162 |
| 5,947,852 A | * | 9/1999 | Moretz ....................... 474/161 |

FOREIGN PATENT DOCUMENTS

| | | | | |
|---|---|---|---|---|
| DE | 3942761 A | * | 12/1989 | ............. F16H/7/06 |
| DE | 3942761 | | 8/1991 | |
| DE | 19620745 | | 12/1996 | |
| DE | 0846889 A1 | * | 11/1997 | ............. F16H/7/06 |
| FR | 592635 | * | 8/1925 | |
| GB | 2164721 | | 3/1986 | |
| GB | 2203816 A | * | 10/1988 | ........... F16H/55/52 |
| JP | 9-169610 | * | 6/1997 | .... F16H/55/30 ... |

* cited by examiner

*Primary Examiner*—David A. Bucci
*Assistant Examiner*—Vicky A. Johnson
(74) *Attorney, Agent, or Firm*—Bierman, Muserlian and Lucas

(57) ABSTRACT

A chainwheel (1) of a control mechanism of an internal combustion engine, said chainwheel being formed in one part or a plurality of parts from at least one hub (1a), a toothed rim (1c) and a wall (1a) connecting the hub (1a) to the toothed rim (1c), provided with at least one means for the damping of vibrations and noises which consists of a noise-damping material.

18 Claims, 4 Drawing Sheets

CHAIN WHEEL WITH DAMPING

FIELD OF THE INVENTION

The invention relates to a chainwheel of a control mechanism of an internal combustion engine, said chainwheel having an axis of rotation and being formed in one part or a plurality of parts from at least one toothed rim and a wall extending from the toothed rim in the direction of the axis of rotation, and the chainwheel being provided with at least one means for the damping of vibrations and noises, the chainwheel being formed from at least one metallic material and the means for the damping of vibrations and noises being formed at least from a damping material.

BACKGROUND OF THE INVENTION

There are many different versions of chainwheels of this type. They are designed, for example, in one part, and disk-shaped, from the toothed rim to the shaft seat or are composed in a plurality of parts, for example, from a toothed rim and a wall connecting a hub to the toothed rim. These chainwheels are usually formed from a composite structure of metal and rubber parts. Thus, for example, DE-39 42 761 C2 describes a chainwheel which is divided into an outer toothed rim and a hub. The hub and the outer toothed rim are separated by a free space which is filled with a noise-damping material. The effect of such a design of a chainwheel is that the toothed rim is separated acoustically from the hub and therefore from the engine.

Damping means of this kind are intended for the damping or uncoupling of vibrations and noises which occur due to the contact of the chain of the control mechanism of an internal combustion engine with the chainwheel. Noises and vibrations of this kind can often be reduced only by extremely soft damping means. This leads, in many cases, to undesirable increases in the degrees of freedom of vibration in the control mechanism.

Since such means for the damping of vibrations and noises are arranged mostly between elements subjected to mechanical load, these means, too, are exposed to mechanical loads. Thus, for example, a torsional moment transmitted by the initially described example of a chainwheel from the hub to the toothed rim also has to be transmitted by the noise-damping material. In particular, in the case of damping means of this kind, run-in jolts of the chain, temperatures and contacts with engine oil lead to premature fatigue and deformation and therefore also to the loss of the damping effect.

A component formed by means of a composite structure consisting of one or more metal parts and damping materials is costly to produce. The metal parts have to be manufactured very accurately and, after being manufactured, must be subjected to careful and costly pretreatment. The subsequent method for bonding the metal parts to the damping means, for example vulcanization or injection molding, is complicated.

SUMMARY OF THE INVENTION

The object of the invention, is therefore, to provide a chainwheel provided with damping means
   which are simple to manufacture,
   which act on the chainwheel in a way free of mechanical loads,
   which are to the greatest possible extent encapsulated from oil influences, and
   which allow the chainwheels to be manufactured cost-effectively.

This object is achieved, according to the invention, in that:
   the chainwheel is provided with one or more holes passing axially through the wall,
   one or more means for the damping of vibrations and noises are arranged within the diameter of the root circle of the toothed rim and axially on both sides of the wall,
   at the same time, the means for the damping of vibrations and noises bear (S) on the wall,
   the means for the damping of vibrations and noises engage (S) into the hole or engage through the hole,
   a holding element bears in each case, on both sides of the wall, against the means for the damping of vibrations and noises,
   the holding elements, between which are arranged the wall and the means for the damping of vibrations and noises, are prestressed relative to one another,
   the holding means prestress the means for the damping of vibrations and noises against the wall, without themselves touching the wall or other parts of the chainwheel.

The chainwheel may be formed continuously from a metallic material in one part or a plurality of parts. In this case, the invention is applicable to chainwheels which are both designed to be continuously disk-shaped or composed of a hub, wall and individual toothed rim and are formed in another way. The damping means are arranged outside the effective range of the chain and on both sides of the chainwheel and are thus free of mechanical loads. The damping means are not injection-molded or vulcanized onto the metallic parts. Damping means of this kind may be produced separately for the manufacture of the chainwheel and subsequently be fastened to the chainwheel by simple means. The possibilities for designing such damping means are many and varied. At all events, the damping means engage into a hole or a plurality of axial holes in the wall of the chainwheel or are led through these holes. An arrangement of this type makes it possible, on the one hand, to achieve effective vibration or noise damping and, on the other hand, thereby to premount or orient the damping means during the operation of mounting it on the chainwheel.

Reliable contact with the wall of the chainwheel and therefore a reliable damping effect are achieved in that the damping means are pressed onto the wall by holding elements. The holding elements are formed, for example, by individual disks or by continuous annularly designed disks. The holding elements are braced relative to one another and therefore also relative to the damping means. Reliable contact with the wall of the chainwheel is ensured and the damping properties of an arrangement of this type can be influenced by the amount of the prestress.

The means for the damping of vibrations and noises are simple to manufacture. The possibilities for designing them and the choice of their material are many and various. In preferred embodiments of the means for the damping of vibrations and noises, this means is formed at least from an elastic rubber material or an elastomer. All other elastic materials, such as, for example, some plastic materials, may also be envisaged. In other preferred embodiments of the invention, the means for the damping of vibrations and noises are formed preferably by plugs or disks. The plugs are in each case inserted into a hole in the wall of the chainwheel or are guided there. It is conceivable to assign a disk to a hole on both sides of the wall in each case or to design the damping means in the form of two annular disks.

At the same time, in each case, one of these annular disks is arranged on one side of the wall and engages with a projection or a plurality of axially protruding projections into corresponding holes in the wall.

The holding elements are preferably produced, in the simplest form, from metal sheets or simple injection moldings consisting of a plastic. The metal sheets are to be provided from ferrous materials or other metallic materials. The holding elements are preferably designed in disk form. At the same time, individual disks may be assigned again to each hole, or a holding element is formed by means of an individual annularly designed disk running continuously on the chainwheel.

The means for the damping of vibrations and noises is to the greatest possible extent shielded against the influences of the engine oil if, as one embodiment of the invention provides, the holding elements are designed as encapsulation.

For connecting the holding elements to one another and bracing them relative to one another, there are various clamping elements. In preferred embodiments, there is provision for using screw connections or rivet connections or for welding the holding elements to one another. At all events, the holding elements are pressed under the action of the clamping elements against the elastic material of the damping means, in order to achieve permanent prestress and ensure that these means are held securely. It is advantageous if the clamping elements are guided in the holes or are led through the holes which cooperate with the damping means. The situation is not ruled out, however, where the clamping elements are led through separately introduced holes, for example bores.

Simplified and therefore cost-effective chainwheels are designed, according to the invention, without any encapsulation. There is therefore provision, furthermore, for above-described embodiments of the means for the damping of vibrations and noises to be used without bracing and encapsulation. In embodiments of the invention, the damping means are fastened to the wall of the chainwheel by means of an adhesive bond or the holes initially described are used.

BRIEF DESCRIPTION OF THE DRAWING

The invention is explained in more detail below with reference to several exemplary embodiments. In the drawing.

DETAILED DESCRIPTION OF THE DRAWING

Figure 2:
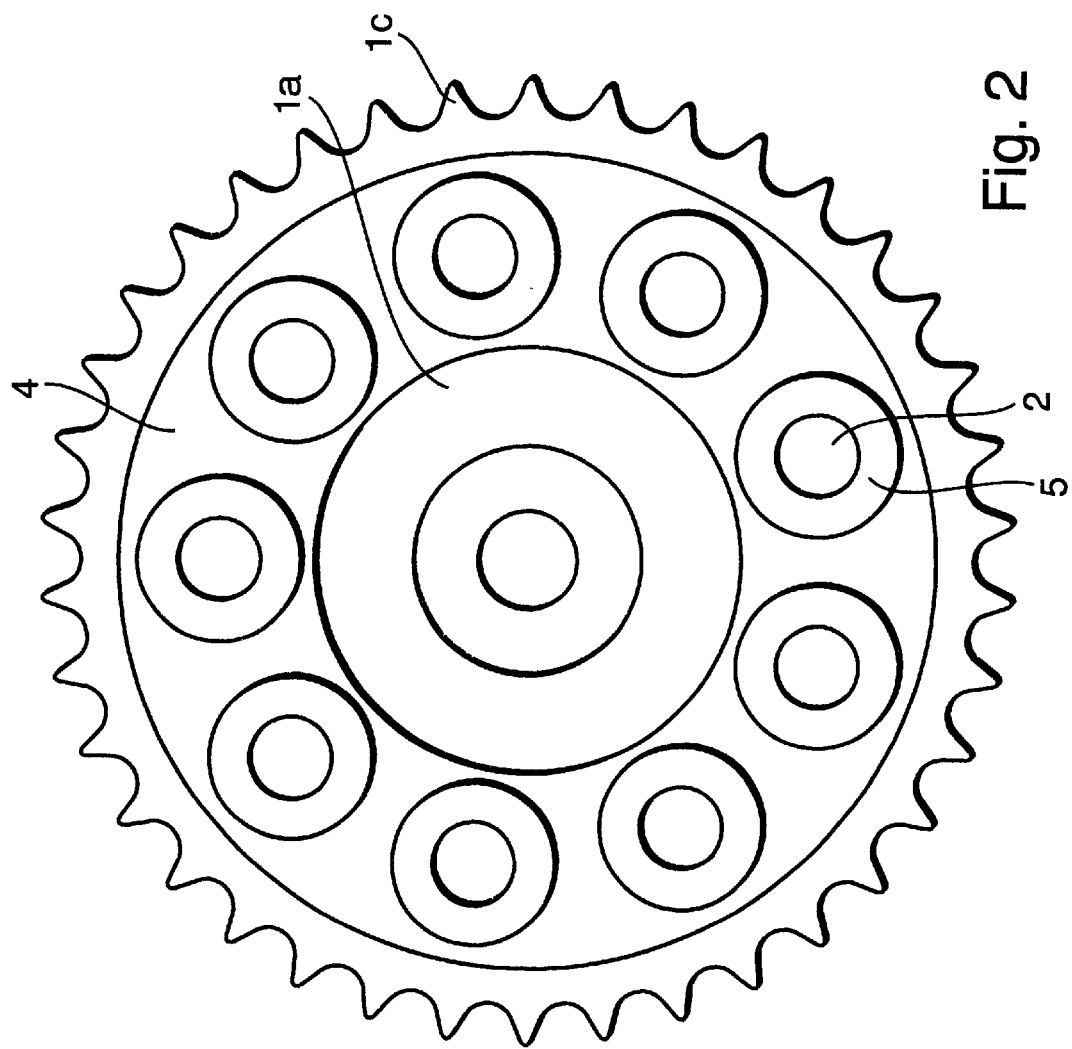
FIG. 2 shows a main view of the chainwheel according to FIG. 2.
Figure 1:
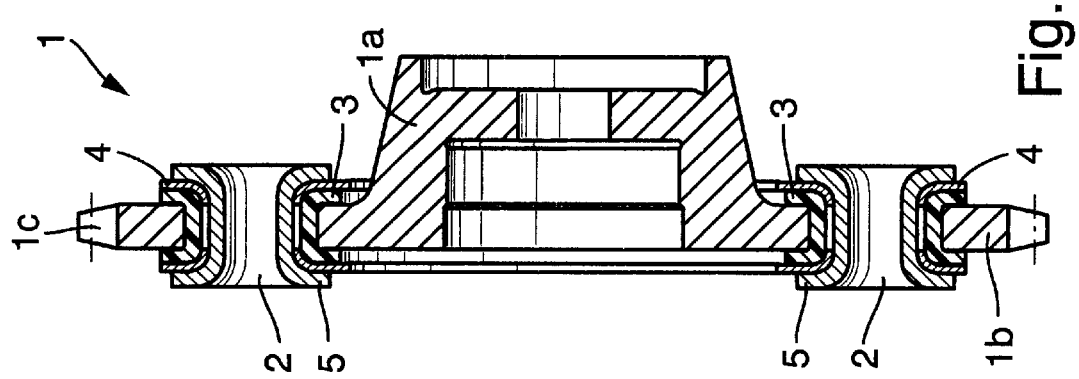
FIG. 1 shows, in a sectional illustration, a side view of an embodiment of a chainwheel according to the invention with plugs for damping and with riveted holding elements.

In FIGS. 1 and 2, an exemplary embodiment of a chainwheel is illustrated by 1. The chainwheel 1 is formed in one part from a hub 1a, a wall 1b and a toothed rim 1c. Holes 2 in the form of bores are introduced into the wall 1b of the chainwheel 1 so as to be distributed at uniform intervals on the circumference. Plugs 3 are seated in the holes 2. The plugs 3 are formed from an elastic material. The plugs 3 are encapsulated in the axial direction on both sides by means of holding elements 4. The plugs 3 are pierced axially in the regions of the holes 2. A rivet connection S designed as a hollow rivet 5 is led in each case through the holes 2 and the plugs 3. The hollow rivet 5 braces the holding elements 4 relative to the plug 3 of the wall 1b of the chainwheel 1.

Figure 4:
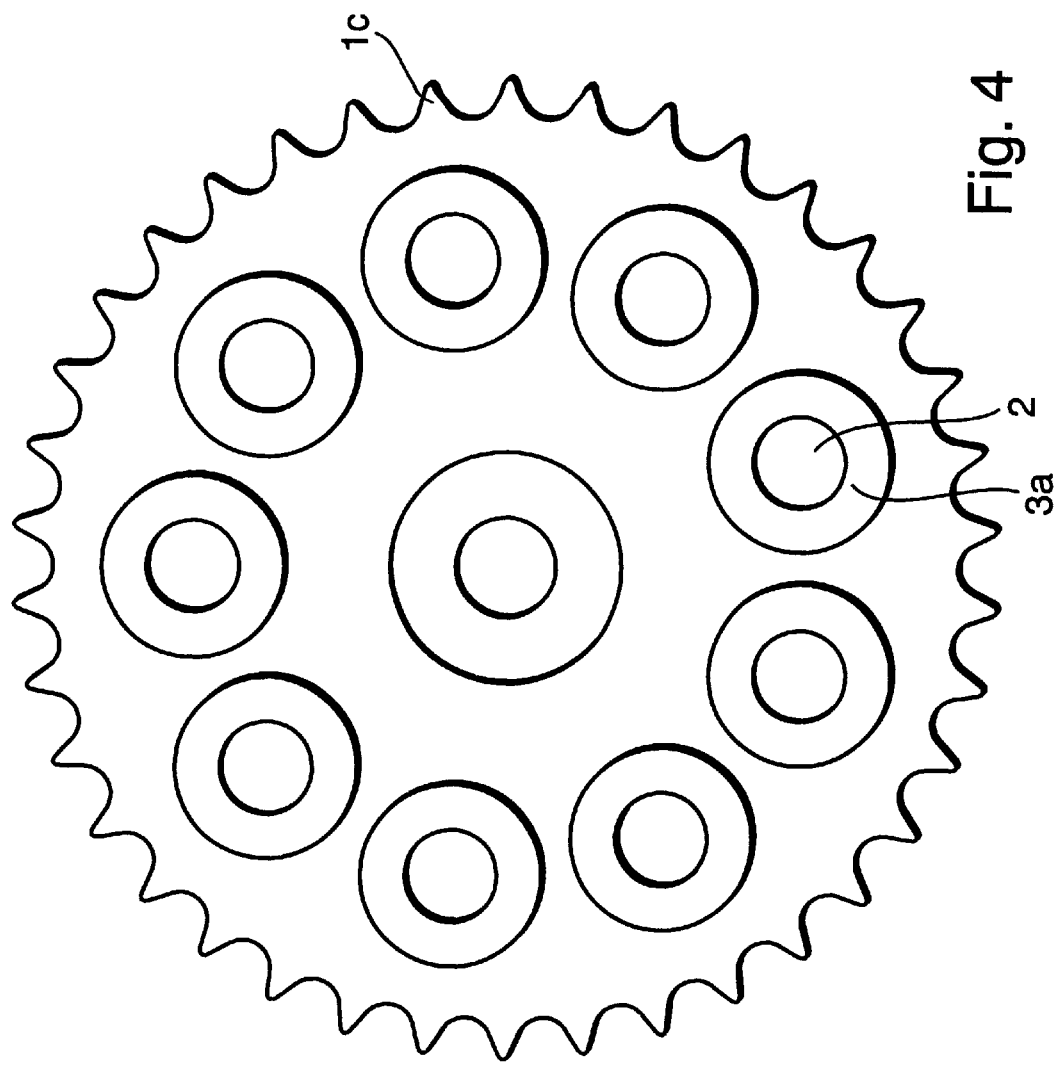
FIG. 4 shows the main view of a chainwheel according to FIG. 3 in a sectional side view.
Figure 3:
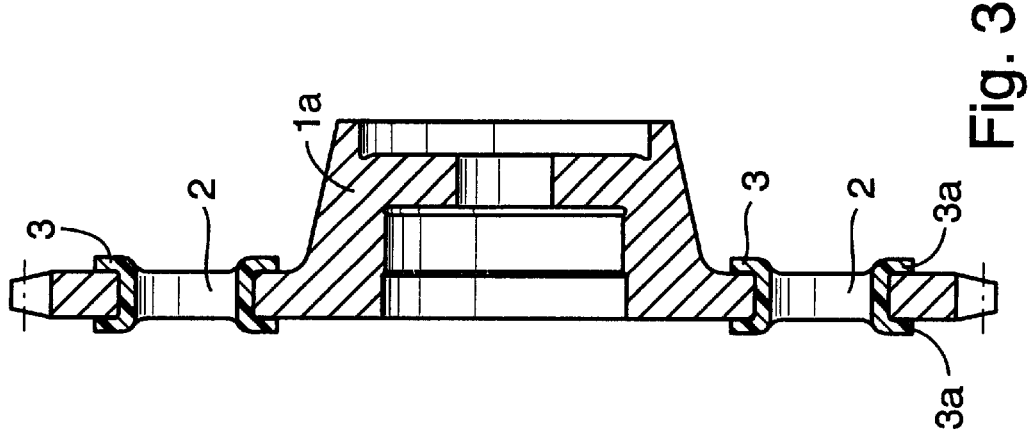
FIG. 3 shows an illustration of the chainwheel according to FIG. 1 without rivets and holding elements.

FIGS. 3 and 4 show the chainwheel 1 without the hollow rivets 5 and the holding elements 4. The plugs 3 are provided on both sides with a continuous flange 3a. The plugs 3 are held in a premounted position on the chainwheel 1 by means of a flange 3a.

Figure 6:
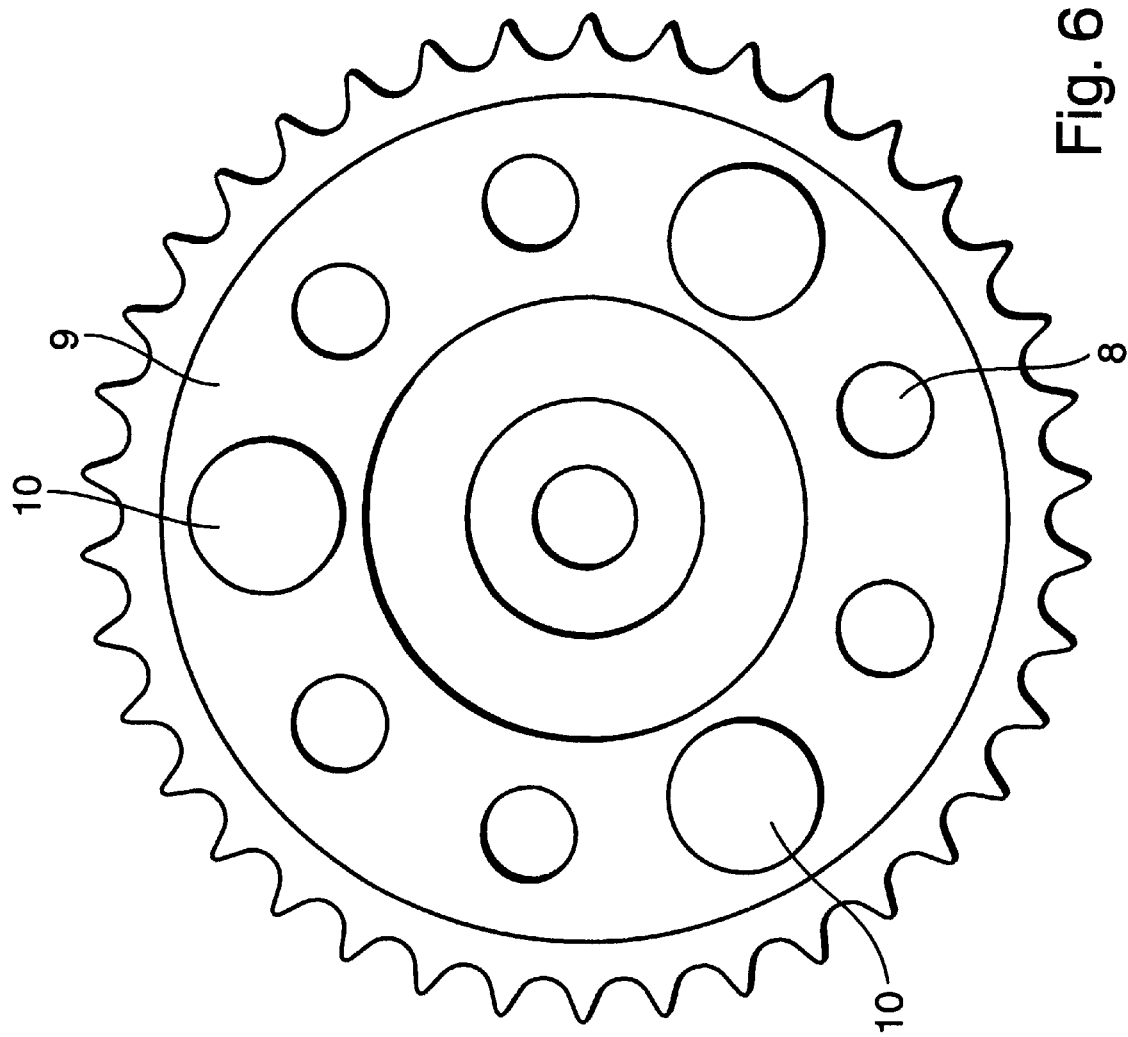
FIG. 6 shows the main view of the chainwheel according to FIG. 5.
Figure 5:
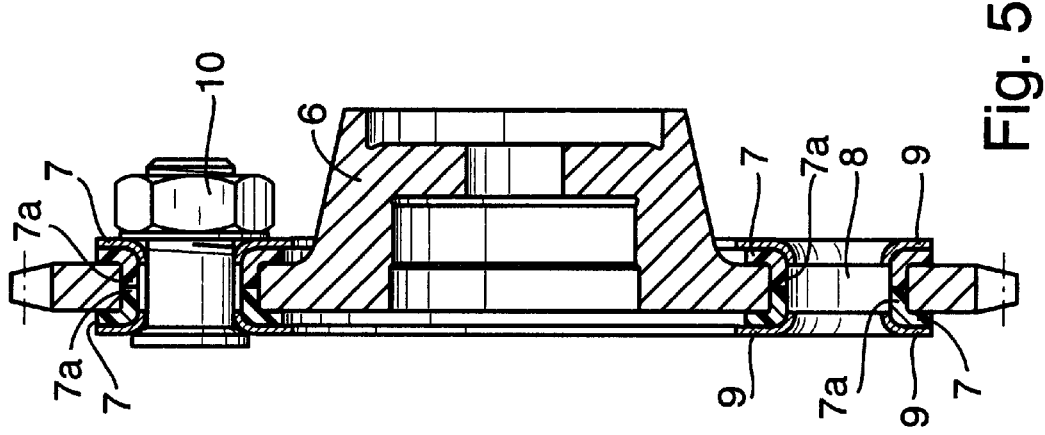
FIG. 5 shows a sectional side view of another exemplary embodiment of a chainwheel according to the invention with screwed holding elements.

FIGS. 5 and 6 show a chainwheel 6 with a means for the damping of vibrations and noises, which is formed by two annularly designed disks 7 consisting of a rubber material. The disks 7 are arranged on both sides of the chainwheel 6 and engage with a plurality of axially protruding projections 7a into holes 8 of the chainwheel 6. The disks are held by means of holding elements 9. The holding elements 9 are likewise designed as annular disks and are prestressed and held by three screw connections 10 arranged on the of the chainwheel 6. The screw connections 10 are guided in the holes 8.

Figure 7:
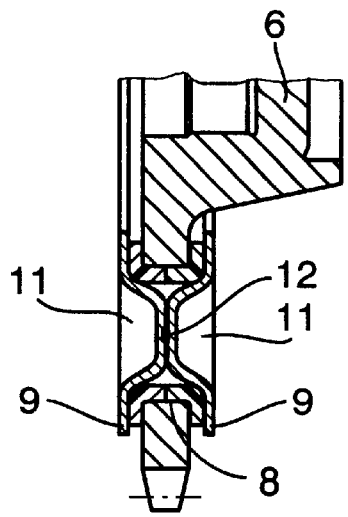
FIG. 7 shows a detail of a side view of the chainwheel according to FIG. 5 with an alternative version of the clamping element.

As an alternative to the illustration according to FIGS. 5 and 6, a fastening and bracing of the holding elements 9 on the chainwheel 6 by means of a weld 12 is illustrated in FIG. 7. The holding elements 9 close the holes 8 by means of cup-like press-out portions 11 and position the disks on the chainwheel 6. The holding elements 9 are welded to one another at the pressed-out portions 11.

Figure 8:
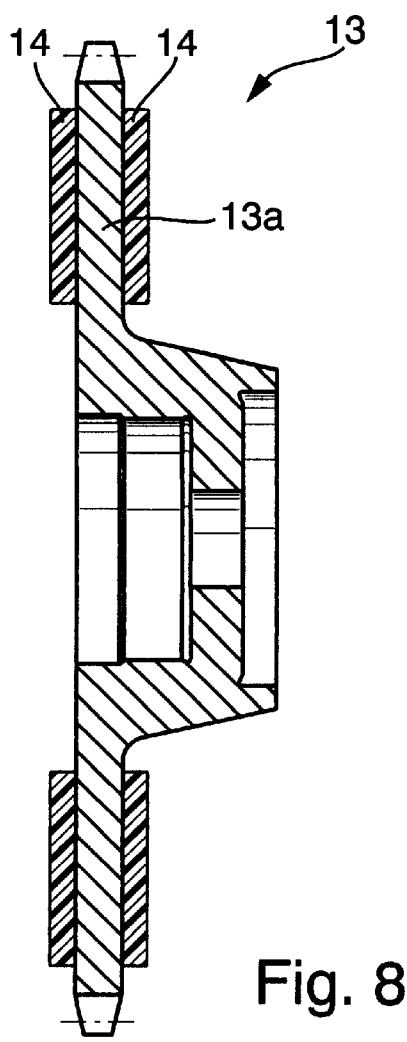
FIG. 8 shows, in section, a further side view of a chainwheel, the damping means of which are adhesively bonded to the wall.

A chainwheel 13 is illustrated in FIG. 8. Annularly designed disks 14 consisting of a damping material are adhesively bonded to the wall 13a of this chainwheel 13.

Figure 9:
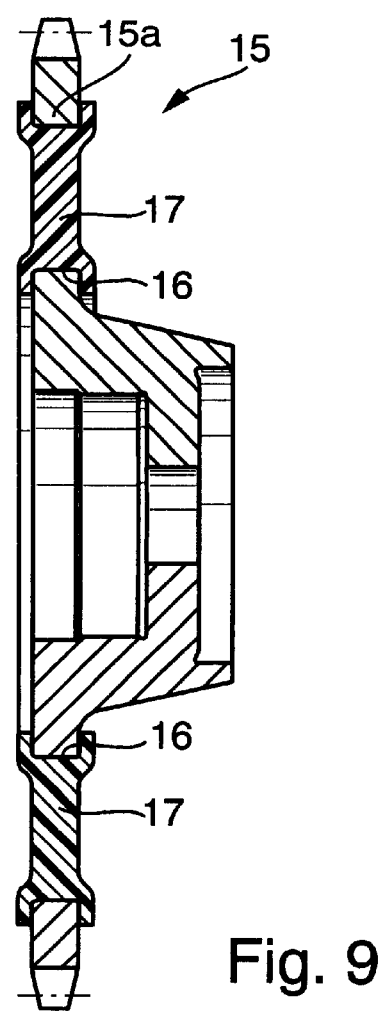
FIG. 9 shows, in section, a side view of a chainwheel with damping means formed from plugs.

Finally, FIG. 9 illustrates a chainwheel 15 which is provided with holes 16 arranged so as to be distributed on the circumference of its wall 15a. Plugs 17 are anchored to the wall 15a via the holes 16.

What is claimed is:

1. A chainwheel (1, 6, 13, 15) of a control mechanism of an internal combustion engine, said chainwheel having an axis of rotation and being formed in one part or a plurality of parts from at least one toothed rim (1c) and a wall (1b) extending from the toothed rim (1c) in the direction of the axis of rotation, and the chainwheel (1, 6, 13, 15) being provided with at least one means for the damping of vibrations and noises, the chainwheel (1, 6, 13, 15) being formed from at least one metallic material and the means for the damping of vibrations and noises formed at least from a noise-damping material, wherein the chainwheel (1, 6) is provided with at least one hole, (2, 8) passing axially through the wall, the means for the damping of vibrations and noises is arranged within the diameter of the root circle of the toothed rim (1c), axially on both sides of the wall (1b), so as to engage into the hole (2, 8) or through the hole (2, 8), and at the same time, bears against the wall (1b), at least one first holding element (4, 98) is arranged on one side of the chainwheel (1, 6) so as to axially adjoin the means for the damping of vibrations and noises, at least one second holding element (4, 9) is arranged axially opposite the first holding element (4, 9), on another side of the chainwheel (1, 6) so as to axially adjoin the means for the damping of vibrations and noises, the first holding element (4, 9) and the second holding element (4, 9) bear, free of contact with the chainwheel (1, 6), on the means for the damping of vibrations and noises, the first holding element (4, 9) and the second holding element (4, 9) are braced relative to one another, and the means for the damping vibrations and noises is braced at least relative to the wall (1c) via the holding elements (4, 9).

2. The chainwheel as claimed in claim 1, wherein the means for the damping of vibrations and noises is formed from at least one rubber material.

3. The chainwheel as claimed in claim 1, wherein the means for the damping of vibrations and noises is formed from at least one elastomer.

4. The chainwheel as claimed in claim 1, wherein the means for the damping of vibrations and noises is formed by at least one plug (3).

5. The chainwheel as claimed in claim 1, wherein the means for the damping of vibrations and noises is formed by disks (7) and at least one disk (7) bears in each case on each side of the wall (1c).

6. The chainwheel as claimed in claim 1, wherein the first holding element (4, 9) and the second holding element (4, 9) are formed by a disk consisting of a metal sheet.

7. The chainwheel as claimed in claim 1, wherein the first holding element (4, 9) and the second holding element (4, 9) are formed by a disk consisting of a plastic.

8. The chainwheel as claimed in claim 1, wherein the first holding element (4, 9) and the second holding element (4, 9) form outwardly, at least in both axial directions, an encapsulation.

9. The chainwheel as claimed in claim 1, wherein the first holding element (9) and the second holding element (9) are connected to one another in a prestressed manner by means of at least one weld (12).

10. The chainwheel as claimed in claim 9, wherein the first holding element (4, 9) and the second holding element (4, 9) are connected to one another by at least one hole (2, 8).

11. The chainwheel as claimed in claim 1, wherein the first holding element (9) and the second holding element (9) are braced relative to one another by means of at least one clamping element, and wherein the clamping element is formed by a screw connection (10).

12. The chainwheel as claimed in claim 11, wherein the screw connection (10) is led through at least one hole.

13. The chainwheel as claimed in claim 1, wherein the first holding element (4) and the second holding element (4) are braced relative to one another by means of at least one clamping element, and wherein the clamping element is formed by a rivet connection (5).

14. The chainwheel as claimed in claim 13, wherein the rivet connection (5) is led through at least one hole.

15. The chainwheel of claim 1, wherein the means for the damping of vibrations and noises is arranged, at least on one side of the wall (13a, 15a), within the diameter of the root circle of the toothed rim.

16. The chainwheel as claimed in claim 15, wherein the means for the damping of vibrations and noises is adhesively bonded to the wall (13a).

17. The chainwheel as claimed in claim 15, wherein the chainwheel (15) is provided with at least one hole (16) passing axially through the wall (15a) and the means for the damping of vibrations and noises is anchored at least in the hole (16).

18. The chainwheel as claimed in claim 17, wherein the means for the damping of vibrations and noises is formed by at least one plug (17).

* * * * *